US011973277B2

(12) United States Patent
Kim et al.

(10) Patent No.: US 11,973,277 B2
(45) Date of Patent: Apr. 30, 2024

(54) ANTENNA MODULE AND ANTENNA DEVICE HAVING THE SAME

(71) Applicant: Tyco Electronics AMP Korea Co., Ltd., Jillyang-Eup Gyeongsan (KR)

(72) Inventors: Jung-Hoon Kim, Suwon (KR); Chang Hyun Lee, Suwon (KR); Dong Wook Park, Suwon (KR)

(73) Assignee: Tyco Electronics AMP Korea Co., Ltd., Jillyang-Eup Gyeongsan (KR)

( * ) Notice: Subject to any disclaimer, the term of this patent is extended or adjusted under 35 U.S.C. 154(b) by 0 days.

(21) Appl. No.: 17/677,066

(22) Filed: Feb. 22, 2022

(65) Prior Publication Data

US 2022/0278457 A1 Sep. 1, 2022

(30) Foreign Application Priority Data

Feb. 26, 2021 (KR) ........................ 10-2021-0026237

(51) Int. Cl.
*H01Q 1/42* (2006.01)
*H01Q 9/04* (2006.01)

(52) U.S. Cl.
CPC ............. *H01Q 9/0414* (2013.01); *H01Q 1/42* (2013.01)

(58) Field of Classification Search
CPC ........ H01Q 9/0414; H01Q 1/42; H01Q 5/335; H01Q 5/371; H01Q 9/0421; H01Q 9/42; H01Q 1/36; H01Q 1/12; H01Q 1/48; H01Q 1/50; H01Q 9/30; H01Q 1/38; H01Q 1/46
See application file for complete search history.

(56) References Cited

U.S. PATENT DOCUMENTS

| | | | | |
|---|---|---|---|---|
| 6,937,205 B2 * | 8/2005 | Chou | H01Q 9/0421 343/841 |
| 2004/0263396 A1 * | 12/2004 | Sung | H01Q 5/371 343/702 |
| 2008/0204328 A1 * | 8/2008 | Nissinen | H01Q 9/0442 343/700 MS |
| 2009/0195458 A1 * | 8/2009 | Chiang | H01Q 9/42 343/700 MS |
| 2010/0127938 A1 * | 5/2010 | Ali | H01Q 1/38 343/700 MS |
| 2011/0304510 A1 * | 12/2011 | Wang | H01Q 1/243 343/702 |
| 2012/0007784 A1 * | 1/2012 | Ling | H01Q 9/0442 343/843 |
| 2013/0063318 A1 * | 3/2013 | Yurugi | H01Q 5/371 343/729 |
| 2013/0229318 A1 * | 9/2013 | Ng | H01Q 5/30 343/770 |

* cited by examiner

*Primary Examiner* — Hai V Tran
*Assistant Examiner* — Michael M Bouizza
(74) *Attorney, Agent, or Firm* — Jay J. Hoette; The Small Patent Law Group, LLC

(57) ABSTRACT

Disclosed is a 5G NR antenna device. An antenna module includes an antenna material formed of a metal material and having a semi-planar inverted-F antenna (PIFA) structure, and a support formed in the shape of a hexahedron with side and bottom faces that are bent from the antenna material by stamping, wherein the support and the antenna material are formed as an integral body.

20 Claims, 5 Drawing Sheets

ANTENNA MODULE AND ANTENNA DEVICE HAVING THE SAME

CROSS REFERENCE TO RELATED APPLICATIONS

This application claims the benefit of Korean Patent Application No. 10-2021-0026237 filed on Feb. 26, 2021, in the Korean Intellectual Property Office, the entire disclosure of which is incorporated herein by reference for all purposes.

BACKGROUND

The subject matter herein relates generally to an antenna module and an antenna device having the same.

An antenna is a component made of a conductor that radiates or receives radio waves to or from other places to achieve the purpose of communication in wireless communication, and may be used in various products such as wireless telegraphs, wireless telephones, radios, and televisions. An antenna device includes antennas and a substrate.

With the recent demand for high-quality multimedia services using wireless mobile communication technology, a next-generation wireless transmission technology for transmitting a larger volume of data faster at a lower error rate is needed.

Meanwhile, a 5G antenna uses a frequency band (FR1) of 6 GHz or less and a millimeter-wave frequency band (FR2). Here, the working band of FR1 uses a low and wide frequency band of 617 MHz to 7125 MHz.

Since FR1 uses a very wide band as described above, an antenna device is made of several antennas in combination. For example, the frequency band was divided into a low band of 617 to 960 MHz, a mid band of 1427 to 2690 MHz, and a high band of 3300 to 7125 MHz, and an antenna device was formed of a combination of antennas supporting the respective divided bands.

Accordingly, a design of an antenna for supporting a wide-band 5G frequency is needed.

The above description is information the inventor(s) acquired during the course of conceiving the present disclosure, or already possessed at the time, and is not necessarily art publicly known before the present application was filed.

BRIEF DESCRIPTION

Example embodiments provide an antenna module for supporting a 5G NR frequency and an antenna device having the same.

The technical tasks obtainable from the present disclosure are non-limited by the above-mentioned technical tasks. And, other unmentioned technical tasks can be clearly understood from the following description by those having ordinary skill in the technical field to which the present disclosure pertains.

An antenna module and an antenna device having the same according to example embodiments will be described.

The antenna module includes an antenna material formed of a metal material and having a semi-planar inverted-F antenna (PIFA) structure, and a support formed in the shape of a hexahedron with side and bottom faces that are bent from the antenna material by stamping, wherein the support and the antenna material are formed as an integral body.

The support may include first to fourth skirt patterns bent from four edge portions of the antenna material at a right angle, and a fifth skirt pattern forming the bottom face of the hexahedron, wherein the first to fourth skirt patterns may be extended to the antenna material at respective upper ends and separated from each other at both side ends.

The antenna material may be mounted to be spaced apart from a mounting face of a substrate in parallel, and the antenna module may be a monopole antenna that is powered by a single feeder formed in the fifth skirt pattern.

The first skirt pattern may form a front face of the hexahedron and be formed on a left side relative to the feeder. The feeder may be extended to a lower end of the first skirt pattern.

The fifth skirt pattern may further include a first mounting portion that is mounted on the substrate, and a second mounting portion that is mounted on an additional mounting pattern formed on the substrate. The feeder, the first mounting portion, and the second mounting portion may be formed to be separated from each other on the same plane. The first mounting portion may be extended to a lower end of the second skirt pattern forming a rear face of the hexahedron. The second mounting portion may be extended to a lower end of the fourth skirt pattern forming a right side face of the hexahedron. The fourth skirt pattern may include an upper skirt extended to the antenna material at an upper end, and a lower skirt extended to the second mounting portion at a lower end and extended to the second skirt pattern at a side end.

The upper skirt and the lower skirt may be formed to be separated from each other in a height direction on the same plane. The third skirt pattern may form a left side face of the hexahedron and may be formed in a shorter length than the first skirt pattern is.

Meanwhile, the antenna device includes an antenna module including an antenna material and a support formed in the shape of a hexahedron with side and bottom faces that are bent from respective edges of the antenna material by stamping, and a substrate on which the antenna module is mounted.

The antenna material may be installed to be spaced apart from a mounting face of the substrate in parallel by the support, and the antenna module may be a monopole antenna in which a single feeder is formed on a bottom face of the antenna module.

The support may include first to fourth skirt patterns bent from four edge portions of the antenna material at a right angle, and a fifth skirt pattern forming the bottom face of the hexahedron, wherein the fifth skirt pattern may include a feeder extended to a lower end of the first skirt pattern, a first mounting portion extended to a lower end of the second skirt pattern, and a second mounting portion extended to a lower end of the fourth skirt pattern.

The substrate may include a feeding area including a plurality of patterns on which the antenna module is mounted, a ground area including a connecting pattern to feed the antenna module, and a matching circuit formed on the connecting pattern. The feeding area may include a mounting pattern on which the first mounting portion is mounted, an additional mounting pattern on which the second mounting portion is mounted, and a feeder pattern on which the feeder is mounted.

The matching circuit may be formed to optionally connect the connecting pattern and the ground area with the feeder pattern. The matching circuit may include a shunt non-connected (NC) provided across the feeder pattern and the ground area and electrically non-connected thereto, a series inductor connecting the feeder pattern and the connecting pattern in series, and a shunt inductor connecting the connecting pattern and the ground area. A gap may be formed between the antenna module and an end portion of the ground area.

Additional aspects of example embodiments will be set forth in part in the description which follows and, in part, will be apparent from the description, or may be learned by practice of the disclosure.

According to example embodiments, an antenna device may form a 5G NR antenna supporting a working band of low-band, mid-band, and high-band FR1 using a single member, an antenna module.

In addition, the antenna module is formed in the shape of a hexahedron by stamping a single metal plate and thus, may be simply manufactured and assembled at a reduced cost, and is mounted at three positions and thus, may improve the mechanical strength.

In addition, the antenna device may have a semi-PIFA structure because a matching circuit based on a monopole antenna having a single feeder may be applied thereto.

In addition, the antenna device may have a wide-band low resonant frequency and improve radiation efficiency in a low frequency band.

The effects of the antenna module and the antenna device having the same are not limited to the above-mentioned effects. And, other unmentioned effects can be clearly understood from the above description by those having ordinary skill in the technical field to which the present disclosure pertains.

BRIEF DESCRIPTION OF THE DRAWINGS

These and/or other aspects, features, and advantages will become apparent and more readily appreciated from the following description of example embodiments, taken in conjunction with the accompanying drawings of which.

DETAILED DESCRIPTION

Figure 1:
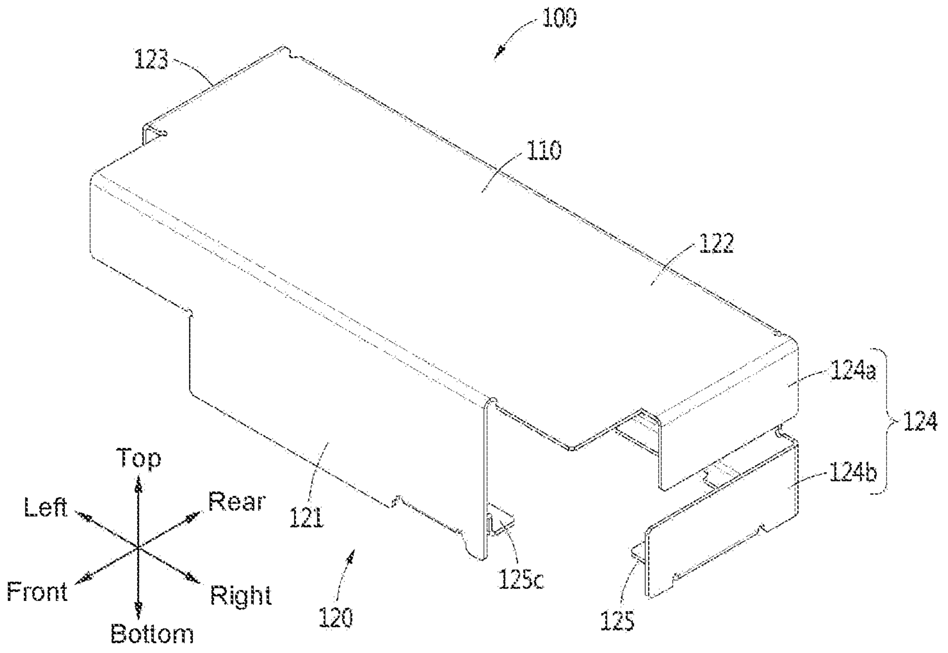
FIG. 1 is a perspective view illustrating an antenna module according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Figure 2:
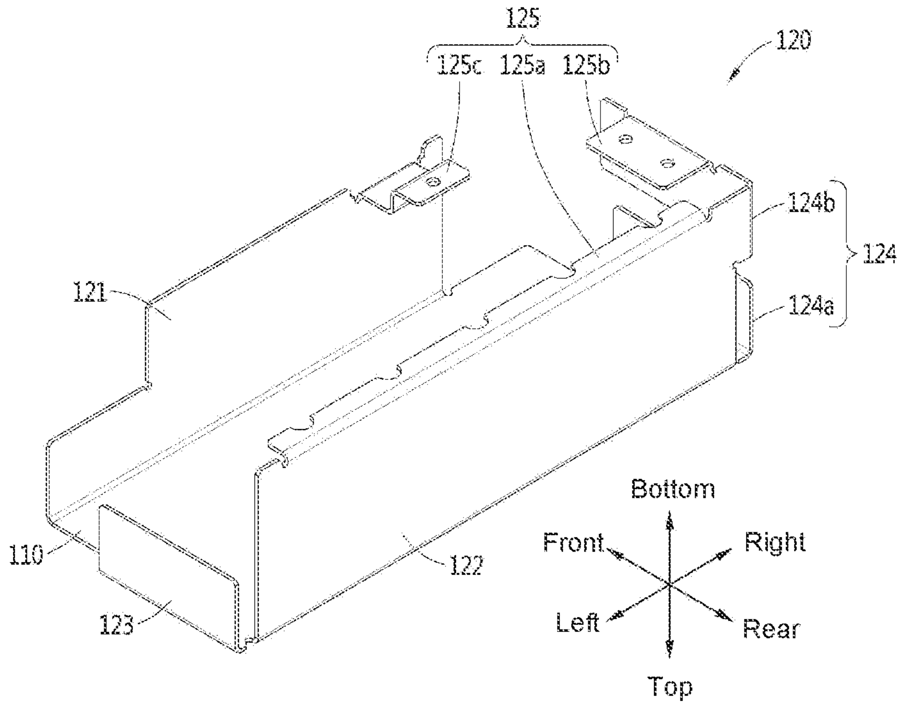
FIG. 2 is a perspective view illustrating the antenna module of FIG. 1 that is turned over.
Figure 3:
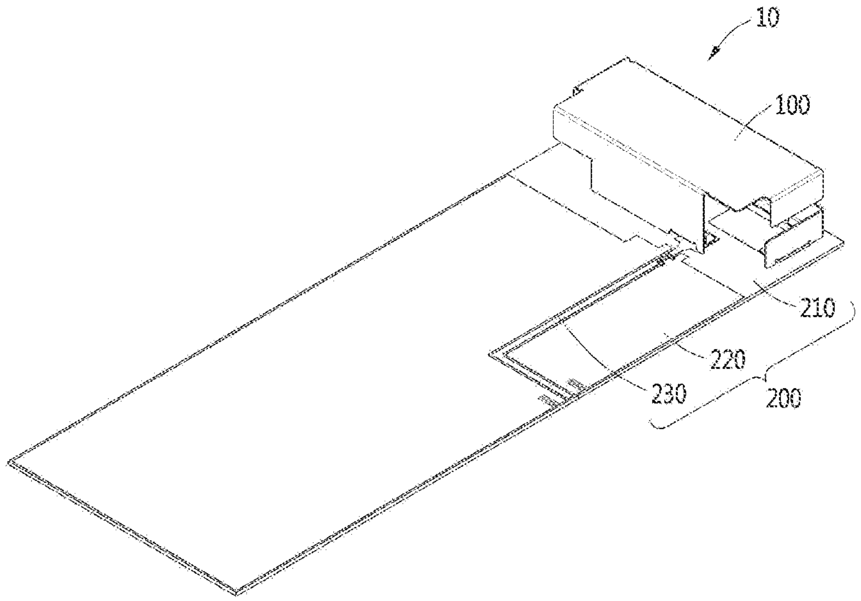
FIG. 3 is a perspective view illustrating an antenna device with an antenna module mounted thereon according to an example embodiment.
Figure 4:
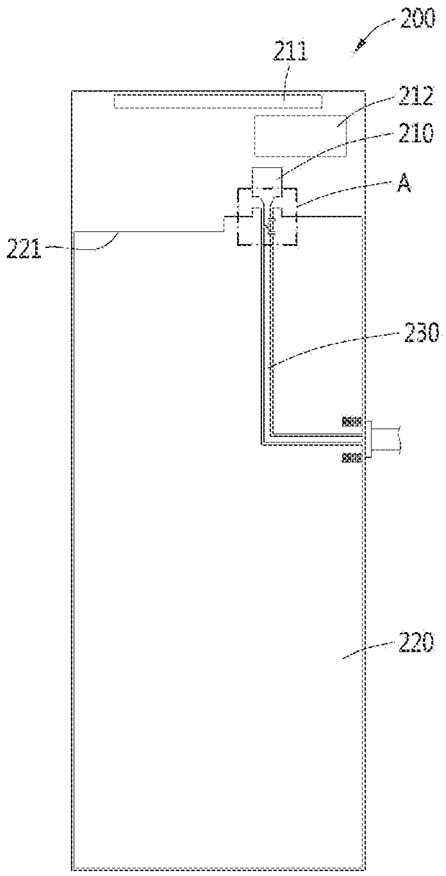
FIG. 4 is a plan view illustrating a substrate in the antenna device of FIG. 3.
Figure 5:
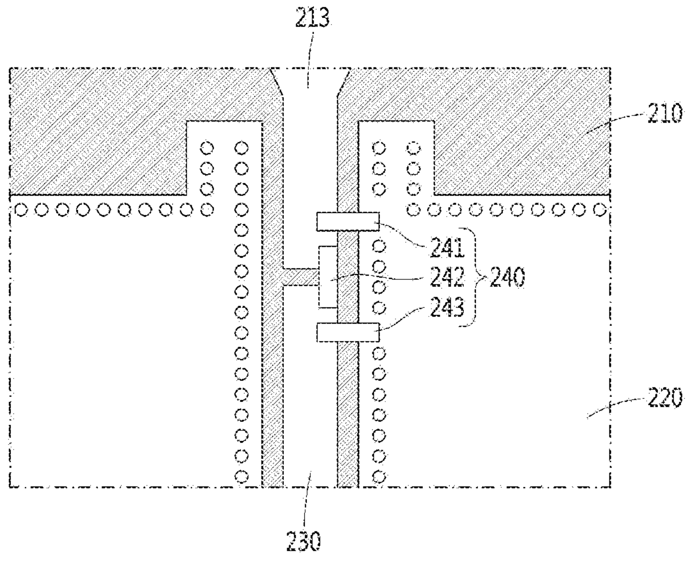
FIG. 5 is an enlarged view of a portion "A" of the substrate of FIG. 4.

Hereinafter, an antenna module 100 and an antenna device 10 having the same will be described with reference to FIGS. 1 to 5. For reference, FIGS. 1 and 2 are perspective views of the antenna module 100, and FIG. 3 is a perspective view of the antenna device 10. FIG. 4 is a plan view of a substrate 200 according to an example embodiment, and FIG. 5 is an enlarged view of a portion "A" of FIG. 4.

Referring to the drawings, the antenna device 10 includes the antenna module 100 and the substrate 200.

First, the antenna module 100 will be described with reference to FIGS. 1 and 2.

The antenna module 100 includes an antenna material 110 and a support 120 that are formed in the shape of a hexahedron by stamping a plate of a metal material and integrally formed as a single member.

The following description will be provided based on the state of the antenna module 110 shown in FIG. 1, and the orientation will be described based on the front and rear/left and right/up and down axes shown in FIG. 1.

The antenna module 100 is a 5G NR antenna and supports a first frequency band FR1 in the range of 617 MHz to 7125 MHz. In addition, the frequency band of 617 to 7125 MHz, which corresponds to the working band of FR1, may be divided into three bands: a low band of 617 to 960 MHz, a mid band of 1427 to 2690 MHz, and a high band of 3300 to 7125 MHz. The antenna module 100 may support all the divided frequency bands. That is, the antenna module 100 may support 617 to 7125 MHz, the working band of FR1, with a single antenna material 110.

In addition, the antenna module 100 includes a single feeder as a monopole antenna and is formed of semi-planar inverted-F antennas (PIFAs).

The antenna material 110 forms a top face of the hexahedron, and is installed to be spaced apart from a mounting face of the substrate 200 in parallel.

The support 120 is a part installed between the antenna material 110 and the substrate 200, and four edge portions of the antenna material 110 may be formed as an integral body by being bent downward at a substantially right angle by stamping. In addition, each face of the support 120 may be formed in the shape of a flat plate. Here, the "right angle" does not necessarily refer to 90 degrees.

The support 120 sequentially include a first skirt pattern 121 forming a front face of the hexahedron, a second skirt pattern 122 forming a rear face, a third skirt pattern 123 forming a left side face, a fourth skirt pattern 124 forming a right side face, and a fifth skirt pattern 125 forming a bottom face.

The first to fourth skirt patterns 121, 122, 123, and 124 are extended to the antenna material 110 at respective upper ends but separated from each other at both side ends. That is, the first to fourth skirt patterns 121, 122, 123, and 124 are formed to be separated from neighboring faces.

The first skirt pattern 121 extends from the top face to the bottom face of the hexahedron, specifically, is extended to the antenna material 110 at the upper end and to the fifth skirt pattern 125 at the lower end. In addition, the first skirt pattern 121 is formed on a left side relative to a feeder 125*c*. This causes a direction of current supplied from the feeder 125*c* to the antenna module 100 to be increased leftward and a flow of the current to make a large turn.

The size and length of the first skirt pattern 121 may produce a high band resonant frequency and improve a Q value of impedance.

The second skirt pattern 122 is formed to be parallel with the first skirt pattern 121 and is extended to the antenna material 110 at the upper end and to the fifth skirt pattern 125 at the lower end.

The second skirt pattern 122 produces a gap coupling effect with the antenna material 110, and the second skirt pattern 122 is the largest in size in the support 120 and in length corresponding to the substrate 200 (that is, the length of the bottom end) and thus, may generate low-band and mid-band resonant frequencies and improve the Q value of impedance.

The third skirt pattern 123 is extended to the antenna material 110 at the upper end, but is extended to the middle in the height direction of the hexahedron at the lower end and thus not to the bottom side.

By adjusting the size and length of the third skirt pattern 123, a high-band resonant frequency may be generated.

In addition, since the third skirt pattern 123 is constrained only at the upper end and free at the lower end, it is easy to adjust the length and size thereof.

The fourth skirt pattern 124 is formed to be parallel to the third skirt pattern 123, and is divided into an upper skirt 124*a* extended to the antenna material 110 and a lower skirt 124*b* extended to the fifth skirt pattern 125.

In addition, the upper skirt 124*a* and the lower skirt 124*b* are separately formed on the same plane, and end portions thereof are formed to be spaced apart from each other on one side along the height direction of the hexahedron.

Here, the gap coupling effect may occur between the antenna material 110 and the lower skirt 124*b*.

The fifth skirt pattern 125 is vertically bent toward the inside of the hexahedron at the lower ends of the skirt patterns 121, 122, and 124 forming the side faces to form the bottom side of the hexahedron. The fifth skirt pattern 125 includes a first mounting portion 125*a*, a second mounting portion 125*b*, and a feeder 125*c*.

The first mounting portion 125*a* is extended to the lower end of the second skirt pattern 122, and is vertically bent toward the front at the lower end of the second skirt pattern 122. The first mounting portion 125*a* is extended to the lower end of the second skirt pattern 122 and thus, may be relatively large in area and length.

The second mounting portion 125*b* is extended to the lower end of the lower skirt 124*b* of the fourth skirt pattern 124 and vertically bent toward the left side at the lower end of the lower skirt 124*b*.

The feeder 125*c* is extended from the lower end of the first skirt pattern 121 and is formed at a position approximately parallel to the first mounting portion 125*a* by vertically bending the lower end of the first skirt pattern 121 toward the rear.

Here, the feeder 125*c* may be bent at the lower end of the first skirt pattern 121 in multiple steps.

Also, in the fifth skirt pattern 125, the first mounting portion 125*a*, the second mounting portion 125*b*, and the feeder 125*c* are formed to be separated from each other on the same plane.

The fifth skirt pattern 125 is a portion that is substantially mounted on the mounting surface of the substrate 200, and the antenna module 100 is fastened to the substrate 200 at three positions: the first mounting portion 125*a*, the second mounting portion 125*b*, and the feeder 125*c*, thereby achieving stable fastening and high mechanical strength.

Also, the fifth skirt pattern 125 may be mounted on the substrate 200 using surface mount technology (SMT).

According to example embodiments, the antenna module 100 may support low-band and mid-band frequencies by adjusting the size and length of the second skirt pattern 122, and support a high-band frequency by adjusting the size and length of the first skirt pattern 121, the third skirt pattern, and the fourth skirt pattern 124. Thus, the antenna module 100 may support a frequency band in the range of 617 to 7125 MHz, which is the working band of FR1 of 5G NR.

In addition, since the antenna material 110 and the first to fourth skirt patterns 121, 122, 123, and 124 excluding the fifth skirt pattern 125 are all provided floating on the substrate 200, the antenna module 100 may disperse the polarization direction of radiated radio waves and widen the radiation range.

In addition, the antenna module 100 has the shape of a hexahedron and thus, may produce a gap coupling effect between the antenna material 110 and the support 120 and may be configured as a monopole antenna using this effect.

In addition, the antenna module 100 is manufactured by stamping a plate of a metal material and thus, may be simply manufactured at a low production cost. In addition, the antenna module 100 may be simply assembled using SMT and the like.

Next, the antenna device 10 and the substrate 200 on which the above-described antenna module 100 is mounted will be described with reference to FIGS. 3 to 5.

The substrate 200 includes a feeding area 210 on which the antenna module 100 is mounted, and a ground area 220. For example, the substrate 200 is an evaluation board, and may be a device for an RF test for the antenna module 100.

Here, the substrate 200 may be formed integrally with a metal layer or circuit on a printed circuit board (PCB).

Although the drawings show the substrate 200 in the shape of a rectangular plate, the shape of the substrate 200 is merely an example for ease of description and may be changed substantially in various manners.

The feeding area 210 may include a plurality of patterns, for example, a mounting pattern 211, a feeder pattern 213, and an additional mounting pattern 212, that are formed of conductors allowing feeding when the antenna module 100 is mounted on.

The first mounting portion 125*a* is mounted on the mounting pattern 211, such that the antenna module 100 is physically fastened. In addition, the mounting pattern 211 is formed to be longer than the additional mounting pattern 212.

The feeder 125*c* is mounted on the feeder pattern 213, such that the feeder pattern 213 is connected to an extending pattern 230 to supply power to the antenna module 100 through the feeder 125*c*.

The second mounting portion 125*b* is mounted on the additional mounting pattern 212 provided between the mounting pattern 211 and the feeder pattern 213.

The additional mounting pattern 212 extends the physical length of the fourth skirt pattern 124, allowing the formation of a low-band resonant frequency.

The feeder pattern 213 for supplying power to the antenna module 100 and the extending pattern 230 for connecting an external power source (not shown) may be formed in the ground area 220, and a matching circuit 240 may be formed on the extending pattern 230.

Here, the feeder pattern 213 extends toward the ground area 220, and the matching circuit 240 is formed to connect an extended end portion of the feeder pattern 213 and the extending pattern 230.

Referring to FIG. 5, the matching circuit 240 includes a shunt nonconnected (NC) 241, a series inductor 242, and a shunt inductor 243.

The shunt NC 241 is provided across the feeder pattern 213 and the ground area 220 but electrically non-connected thereto.

The series inductor 242 is provided to connect the feeder pattern 213 and the extension pattern 230 in series.

The shunt inductor 243 is provided to connect the extension pattern 230 and the ground area 220.

The matching circuit 240 is a backward coupling configured to be connected in the order of the feeder pattern 213, the shunt NC 241, the series inductor 242, and the shunt inductor 243 in the antenna module 100. In addition, the matching circuit 240 may produce mid-band and high-band resonant frequencies by a frequency multiplication effect by the low-band resonant frequency, thereby improving the impedance of the low-band resonant frequency and the bandwidth.

The antenna device 10 is formed by mounting the antenna module 100 on the feeding area 210 of the substrate 200.

Here, the antenna device 10 may have a semi-PIFA structure because a matching circuit based on a monopole antenna having a single feeder may be applied thereto.

That is, the antenna device 10 may be configured as a monopole antenna by the gap coupling effect produced between the antenna material 110 and each skirt pattern 122, 123, 124 in the antenna module 100 formed in the shape of a hexahedron. Further, the antenna device 10 may form a PIFA antenna in which the first skirt pattern 121 is coupled to the feeder 125*c* to serve as a feeding part, and the antenna material 110, the second to fifth skirt patterns 122, 123, 124, and 125, and the mounting pattern 211 of the substrate 200 serve as an antenna main body.

In addition, the antenna device 10 may form the antenna module 100 in the shape of a hexahedron, thereby producing a wide-band low resonant frequency and producing mid-band and high-band resonant frequencies by a multiplication frequency effect by a primary low-band resonant frequency and thereby improving the impedance of the low-band resonant frequency and the bandwidth.

Here, since the antenna device 10 is a monopole antenna, the distances from the antenna material 110 to the second skirt pattern 122, the first mounting portion 125*a*, and the mounting pattern 211 are a quarter of a first resonance frequency wavelength. Further, in the antenna device 10, the distances from the antenna material 110 to the second skirt pattern 122, the lower skirt 124*b*, the second mounting portion 125*b*, and the additional mounting pattern 212 are a quarter of a second resonant frequency wavelength.

In this way, the antenna device 10 serves as a 5G NR antenna that supports all low, mid, and high bands by means of the distances between the antenna module 100 and the mounting patterns 211 and 212 of the substrate 200.

In addition, the antenna device 10 includes a gap 221 formed as the antenna module 100 and the ground area 220 are spaced apart by a predetermined distance. By adjusting the gap 221, it is possible to form the antenna device 10 having a wide-band low resonant frequency and improve radiation efficiency in a low frequency band.

Meanwhile, although the antenna module 100 is manufactured using stamping in the above example embodiments, laser direct structuring (LDS) may be used alternatively.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An antenna module comprising:

an antenna material formed of a metal material and having a semi-planar inverted-F antenna (PIFA) structure; and a support formed in the shape of a hexahedron having a front face, a rear face, a top face, a bottom face, a right side face, and a left side face, the front and rear faces are bent from the top face by stamping, the top face filling a majority of a space between the front face and the rear face, the top face filling a majority of a space between the right side face and the left side face, the front face filling a majority of a space between the top face and the bottom face, the front face filling a majority of a space between the right side face and the left side face, the rear face filling a majority of a space between the top face and the bottom face, the rear face filling a majority of a space between the right side face and the left side face, wherein the support and the antenna material are formed as an integral body.

2. The antenna module of claim 1, wherein the support comprises:

first to fourth skirt patterns bent from four edge portions of the top face at a right angle, the first to fourth skirt patterns forming the front face, the rear face, the left side face, and the right side face, respectively; and a fifth skirt pattern forming the bottom face of the hexahedron, wherein the first to fourth skirt patterns are extended to the top face at respective upper ends and separated from each other at both side ends.

3. The antenna module of claim 2, wherein the top face is mounted to be spaced apart from a mounting face of a substrate in parallel, and the antenna module is a monopole antenna that is powered by a single feeder formed in the fifth skirt pattern.

4. The antenna module of claim 3, wherein the first skirt pattern is formed on a left side relative to the feeder.

5. The antenna module of claim 4, wherein the feeder is extended to a lower end of the first skirt pattern.

6. The antenna module of claim 3, wherein the fifth skirt pattern further comprises:

a first mounting portion that is mounted on the substrate; and a second mounting portion that is mounted on an additional mounting pattern formed on the substrate.

7. The antenna module of claim 6, wherein the feeder, the first mounting portion, and the second mounting portion are formed to be separated from each other on the same plane.

8. The antenna module of claim 6, wherein the first mounting portion is extended to a lower end of the second skirt pattern.

9. The antenna module of claim 6, wherein the second mounting portion is extended to a lower end of the fourth skirt pattern.

10. The antenna module of claim 9, wherein the fourth skirt pattern comprises:

an upper skirt extended to the top face at an upper end; and a lower skirt extended to the second mounting portion at a lower end and extended to the second skirt pattern at a side end.

11. The antenna module of claim 10, wherein the upper skirt and the lower skirt are formed to be separated from each other in a height direction on the same plane.

12. The antenna module of claim 3, wherein the third skirt pattern is formed in a shorter length than the first skirt pattern is.

13. An antenna device comprising:

an antenna module comprising an antenna material and a support formed in the shape of a hexahedron having a front face, a rear face, a top face, a bottom face, a right side face, and a left side face, the front and rear faces are bent from respective edges of the top face by stamping, the top face filling a majority of a space between the front face and the rear face, the top face filling a majority of a space between the right side face and the left side face, the front face filling a majority of a space between the top face and the bottom face, the front face filling a majority of a space between the right side face and the left side face, the rear face filling a majority of a space between the top face and the bottom face, the rear face filling a majority of a space between the right side face and the left side face; and a substrate on which the antenna module is mounted.

14. The antenna device of claim 13, wherein the top face is installed to be spaced apart from a mounting face of the substrate in parallel by the support, and the antenna module is a monopole antenna in which a single feeder is formed on the bottom face of the antenna module.

15. The antenna device of claim 14, wherein the support comprises:

first to fourth skirt patterns bent from four edge portions of the top face at a right angle, the first to fourth skirt patterns forming the front face, the rear face, the left side face, and the right side face, respectively; and a fifth skirt pattern forming the bottom face of the hexahedron, wherein the fifth skirt pattern comprises:

a feeder extended to a lower end of the first skirt pattern;

a first mounting portion extended to a lower end of the second skirt pattern; and a second mounting portion extended to a lower end of the fourth skirt pattern.

16. The antenna device of claim 15, wherein the substrate comprises:

a feeding area comprising a plurality of patterns on which the antenna module is mounted;

a ground area comprising a connecting pattern to feed the antenna module; and a matching circuit formed on the connecting pattern.

17. The antenna device of claim 16, wherein the feeding area comprises:

a mounting pattern on which the first mounting portion is mounted;

an additional mounting pattern on which the second mounting portion is mounted; and a feeder pattern on which the feeder is mounted.

18. The antenna device of claim 17, wherein the matching circuit is formed to optionally connect the connecting pattern and the ground area with the feeder pattern.

19. The antenna device of claim 18, wherein the matching circuit comprises:

a shunt non-connected (NC) provided across the feeder pattern and the ground area and electrically non-connected thereto;

a series inductor connecting the feeder pattern and the connecting pattern in series; and a shunt inductor connecting the connecting pattern and the ground area.

20. The antenna device of claim 17, wherein a gap is formed between the antenna module and an end portion of the ground area.

* * * * *